United States Patent
Shah et al.

(10) Patent No.: US 12,319,249 B2
(45) Date of Patent: Jun. 3, 2025

(54) DISTRIBUTED ELECTRIC PARK BRAKE CONTROL

(71) Applicant: Robert Bosch GmbH, Stuttgart (DE)

(72) Inventors: Ankit Shah, Canton, MI (US); Anthony J. Farrell, Brooklyn, MI (US); Sivaraja Velusamy, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 491 days.

(21) Appl. No.: 16/877,667

(22) Filed: May 19, 2020

(65) Prior Publication Data
US 2020/0369253 A1    Nov. 26, 2020

Related U.S. Application Data

(60) Provisional application No. 62/852,031, filed on May 23, 2019.

(51) Int. Cl.
*B60T 13/58*    (2006.01)
*B60T 7/04*    (2006.01)
(Continued)

(52) U.S. Cl.
CPC .............. *B60T 13/58* (2013.01); *B60T 7/042* (2013.01); *B60T 8/1755* (2013.01);
(Continued)

(58) Field of Classification Search
CPC ............ B60T 13/745; B60T 2270/402; B60T 2270/413; B60T 2270/82; B60T 8/4081;
(Continued)

(56) References Cited

U.S. PATENT DOCUMENTS 6,299,261 B1 * 10/2001 Weiberle ................. B60T 13/74
  303/122.04
6,969,127 B2    11/2005 Suzuki et al.
(Continued)

FOREIGN PATENT DOCUMENTS

CN    104760586 A  *  7/2015
DE    4229041 A1    3/1993
(Continued)

OTHER PUBLICATIONS

Translation of CN104760586, retrieved Sep. 30, 2022 (Year: 2022).*
(Continued)

*Primary Examiner* — Bradley T King
(74) *Attorney, Agent, or Firm* — Michael Best & Friedrich LLP

(57) ABSTRACT

Systems and methods are described for distributed electric park brake control. The vehicle's electronic stability controller (ESC) is configured to monitor the status of an electric parking brake switch and to provide control signals to a motor-on-caliper actuator based on the status of the electric parking brake switch. A secondary brake system controller (for example, a brake pedal "booster" unit) that is configured to control at least one function of the braking system that is not related to the parking brake function is further configured to determine whether the ESC is operating properly and, in response to determining that the ESC is not operating properly, to monitor the status of the electric parking brake switch and provide the control signals to the motor-on-caliper actuator based on the status of the electric parking brake switch.

12 Claims, 6 Drawing Sheets

(51) Int. Cl.
  *B60T 8/1755* (2006.01)
  *B60T 13/74* (2006.01)
  *B60T 8/40* (2006.01)

(52) U.S. Cl.
  CPC .......... *B60T 13/741* (2013.01); *B60T 8/4081* (2013.01); *B60T 2270/304* (2013.01); *B60T 2270/402* (2013.01); *B60T 2270/404* (2013.01)

(58) Field of Classification Search
  CPC .............. B60T 8/409; B60T 2270/304; B60T 2270/404; B60T 13/58; B60T 13/741; B60T 7/042; B60T 8/1755
  See application file for complete search history.

(56) References Cited

U.S. PATENT DOCUMENTS

| | | | |
|---|---|---|---|
| 8,041,475 B2 | 10/2011 | Fujita et al. | |
| 9,611,910 B2 | 4/2017 | Murata et al. | |
| 2002/0117891 A1 | 8/2002 | Harris | |
| 2005/0029859 A1 | 2/2005 | Bensch et al. | |
| 2009/0189441 A1* | 7/2009 | Degoul | B60T 8/885 |
| | | | 303/3 |
| 2009/0195058 A1 | 8/2009 | Jackson et al. | |
| 2010/0241330 A1* | 9/2010 | Hartmann | B60T 8/344 |
| | | | 701/70 |
| 2010/0252378 A1 | 10/2010 | Hilberer | |
| 2011/0320099 A1* | 12/2011 | Kim | B60T 8/885 |
| | | | 701/70 |
| 2013/0140879 A1* | 6/2013 | Kneip | B60T 8/4018 |
| | | | 303/14 |
| 2013/0282249 A1* | 10/2013 | Heise | B60T 13/746 |
| | | | 701/70 |
| 2014/0196994 A1* | 7/2014 | Schneider | B60T 17/221 |
| | | | 188/161 |
| 2014/0333123 A1* | 11/2014 | Kunz | B60T 8/4072 |
| | | | 303/3 |
| 2016/0059706 A1* | 3/2016 | Kunz | B60T 8/4086 |
| | | | 303/3 |
| 2016/0214582 A1* | 7/2016 | Brenn | B60T 7/042 |
| 2017/0008401 A1 | 1/2017 | Stemmer | |
| 2017/0072920 A1* | 3/2017 | Besier | B60T 8/4081 |
| 2017/0158182 A1* | 6/2017 | Foitzik | B60T 13/745 |
| 2017/0274884 A1* | 9/2017 | Besier | B60T 13/148 |
| 2018/0236974 A1 | 8/2018 | Kubb et al. | |
| 2018/0244255 A1 | 8/2018 | Kawai et al. | |
| 2018/0334148 A1* | 11/2018 | Feigel | B60T 7/042 |
| 2020/0079335 A1* | 3/2020 | Linhoff | B60T 8/40 |
| 2020/0139949 A1* | 5/2020 | Dolmaya | B60T 8/4081 |
| 2021/0009095 A1* | 1/2021 | Kim | B60T 1/10 |
| 2021/0129817 A1* | 5/2021 | Michels | B60T 8/1755 |
| 2021/0179051 A1* | 6/2021 | Alford | B60T 8/176 |
| 2021/0347370 A1* | 11/2021 | Nemeth | B60W 50/029 |
| 2021/0354672 A1* | 11/2021 | Qiang | B60T 8/885 |
| 2022/0041150 A1* | 2/2022 | Leiber | B60T 13/12 |
| 2022/0126807 A1* | 4/2022 | Oehler | B60T 13/745 |
| 2022/0144224 A1* | 5/2022 | Tarandek | B60T 7/06 |
| 2022/0169222 A1* | 6/2022 | Ullrich | B60T 13/686 |
| 2022/0194339 A1* | 6/2022 | Tarandek | B60T 8/326 |
| 2022/0194344 A1* | 6/2022 | Tarandek | B60T 17/22 |

FOREIGN PATENT DOCUMENTS

| | | |
|---|---|---|
| DE | 102015211877 A1 | 12/2015 |
| DE | 102016222830 A1 | 5/2017 |
| WO | 2011141158 A2 | 11/2011 |
| WO | 2018219789 A1 | 12/2018 |

OTHER PUBLICATIONS

International Search Report and Written Opinion for Application No. PCT/EP2018/079538 dated Dec. 21, 2018 (15 pages).
Translation of Chinese Patent Office Action for Application No. 202010440852 (10 pages).

* cited by examiner

DISTRIBUTED ELECTRIC PARK BRAKE CONTROL

RELATED APPLICATIONS

This application claims the benefit of U.S. Provisional Application No. 62/852,031, filed May 23, 2019 and entitled "DISTRIBUTED ELECTRIC PARK BRAKE CONTROL," the entire contents of which are incorporated herein by reference.

BACKGROUND

The present invention relates to vehicle brake systems and parking brakes for vehicles. More specifically, the present invention relates to systems for controlling the operation of vehicle brakes.

SUMMARY

In one embodiment, the invention provides a vehicle braking system including an electronic stability controller (ESC) and a secondary brake system controller. The ESC is configured to control the braking force distribution to a plurality of wheels of the vehicle to enhance performance and stability. The ESC is also configured to monitor the status of an electric parking brake switch and to transmit a control signal to a motor-on-caliper actuator based on the status of the electric parking brake switch. When the electric parking brake switch is in an on-state, the control signal causes the motor-on-caliper actuator to extend a caliper piston and apply a clamping force to a brake rotor. When the electric parking brake switch is in an off-state, the control signal causes the motor-on-caliper actuator to retract the caliper piston. The secondary brake system controller is configured to control at least one function of the braking system that is not related to the parking brake function and to determine whether the ESC is operating properly. In response to determining that the ESC is not operating properly, the secondary brake system controller will monitor the status of the electric parking brake switch and transmits the control signal to the motor-on-caliper actuator based on the status of the electric parking brake switch.

In some implementations, the second brake system controller is configured to generate and transmit the control signals to the motor-on-caliper actuator based on the same parking brake control software library as the ESC and, therefore, there is no perceptible difference to a driver of the vehicle when the parking brake is applied by the ESC or by the secondary brake system controller.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
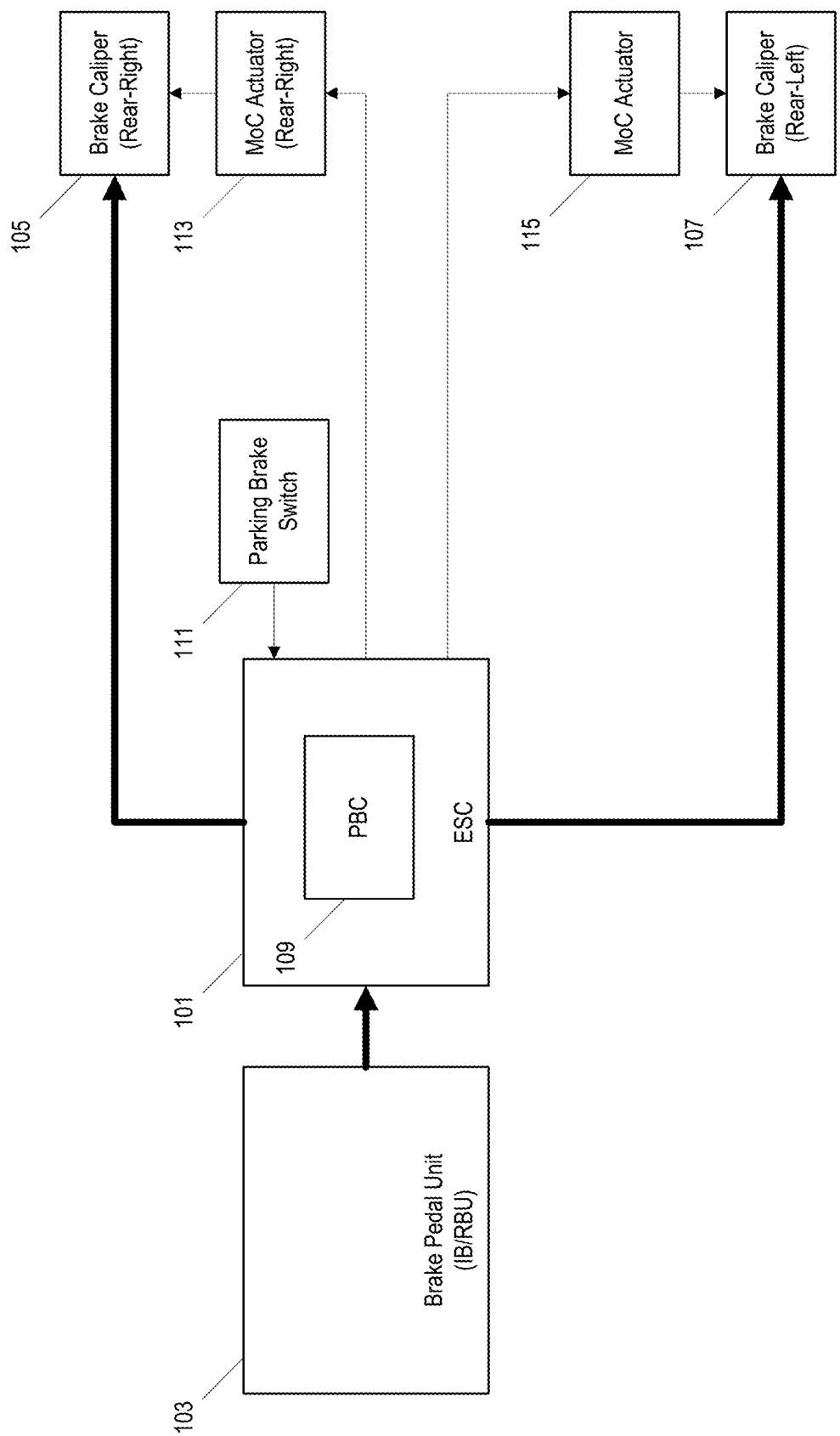
FIG. 1 is a schematic diagram of a first example of a braking system in which the electric parking brake is controlled by an electronic stability controller (ESC).

FIG. 1 illustrates an example of a vehicle braking system that includes an electric parking brake (EPB) system that controls the clamping forces on the rear axle of a vehicle. A brake pedal unit 103 (for example, a brake "booster" such as the Bosch iBooster) is actuated by the brake pedal of the vehicle and provides a hydraulic fluid output to an electronic stability controller (ESC) 101. The ESC 101 controllably adjusts the hydraulic braking pressure based in part on the input from the brake pedal unit 103 and provides adjusted hydraulic pressures to the rear-right brake caliper 105 and the rear-left brake caliper 107. The ESC 101 may be configured to control the distribution of braking force to the wheels of the vehicle and may apply advanced braking techniques to improve the performance and stability of the vehicle. The brake pedal unit 103, in some implementations, includes an electric motor that maintains consistent "pedal feel" even when the ESC 101 adjusts the hydraulic braking pressure provide to the brakes or when other braking mechanism (e.g., regenerative braking) is used to apply a braking force to the vehicle.

In the example of FIG. 1, the ESC 101 is also programmed to provide the functionality of the electronic parking brake control (PBC) 109. The ESC 101 monitors the state of a parking brake switch 111 which, in this example, is provided as a physical switch positioned in the interior cab of the vehicle and can be manually operated by a driver between an "off" state and an "on" state.

In the example of FIG. 1, the brake calipers 105, 107 are equipped with "motor-on-caliper" (MoC) actuators 113, 115, respectively, which each include a bidirectional electric motor incorporated into each brake caliper. The electric motors mechanically cause the caliper piston of the respective caliper to move, thereby providing a clamping force on the rotor of the brake. In response to determining that the parking brake switch 111 is in the "on" state, the PBC 109 of the ESC 101 generates control signals to each of the MoC actuators 113, 115 causing the brake calipers to apply a clamping force on each rotor. When the parking brake switch 111 is changed to the "off" state, the PBC 109 of the ESC 101 generates control signals to the MoC actuators 113, 115 causing the brake caliper pistons to retract and removing the clamping force from the rear brakes.

In addition to extending and retracting the caliper pistons in response to the current state of the parking brake switch 111, the PBC 109 may be configured to provide additional parking brake control functionality including, for example, a drive-away-release mechanism (in which the parking brake is "released" when the vehicle is operated to move), actuator dynamic deceleration, roller bench functions, brake pad wear adjustment, hydraulic support, and "reclamp" functions (e.g., hot reclamp, roll-away reclamp, etc.). However, in the system of FIG. 1, a fault in the ESC module 101 causes all of the parking brake functionality to be unavailable.

In some implementations, as described in further detail below, the ESC 101 and/or the brake pedal unit 103 include an electronic controller configured to provide a control signal output to an actuator based on an electrical signal from, for example, the parking brake switch and/or the brake pedal. In some such implementations, the brake pedal unit (such as, for example, brake pedal unit 103 in the example of FIG. 1) may include an "iBooster" and/or a redundant braking unit ("RBU"). An iBooster braking unit is an electronic brake booster (as opposed to a vacuum booster). An RBU is a braking control system separate from the electronic stability controller (ESC) that, like the ESC, is able to decelerate the vehicle independent of the driver applying the brake pedal.

Figure 2:
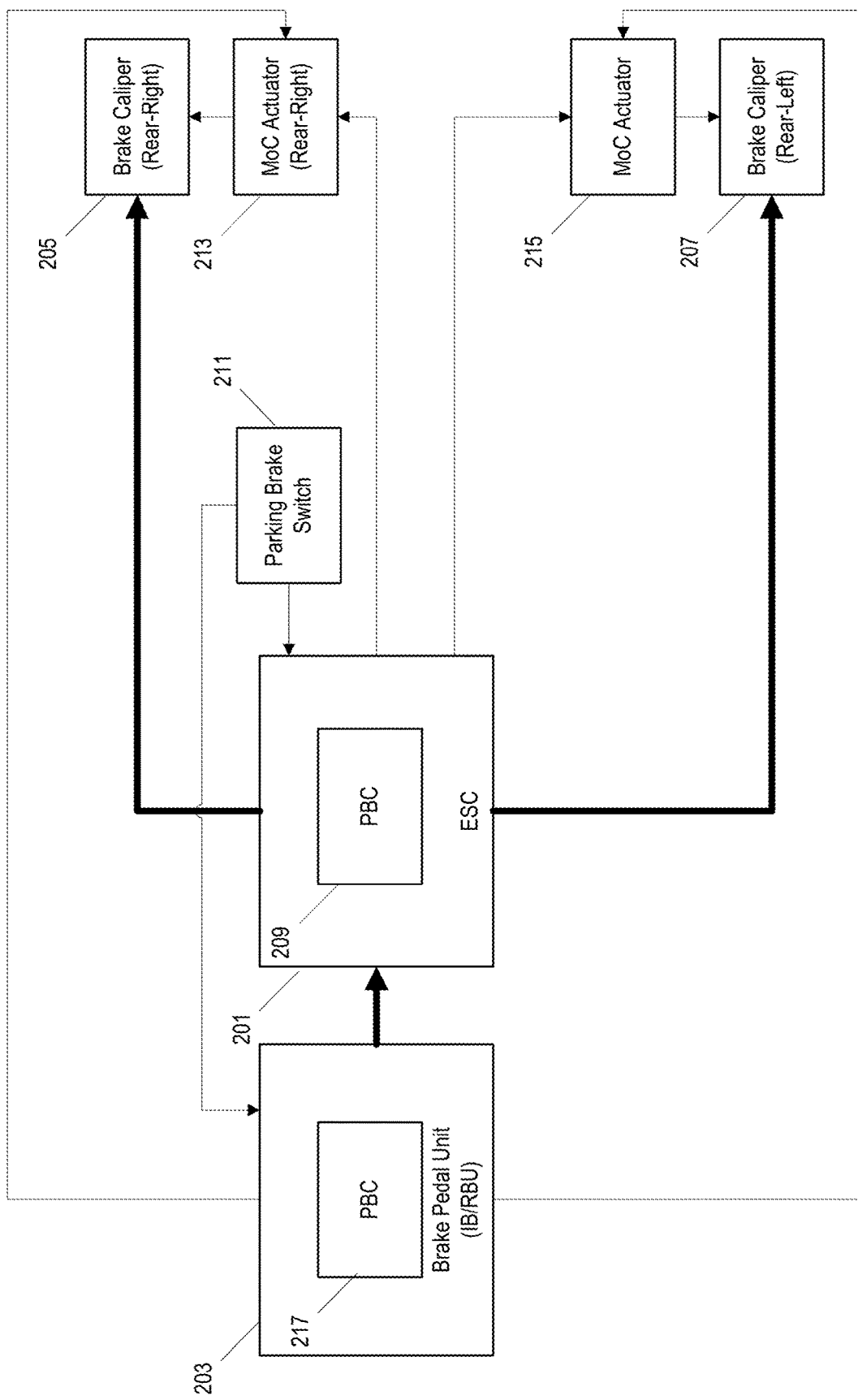
FIG. 2 is a schematic diagram of a second example of a braking system with redundant/distributed control of the electric parking brake.

FIG. 2 illustrates an example of an alternative braking system configuration in which the parking brake control functionality (including both the software library and wiring) is implemented into two actuators to provide redundancy in park brake control. As in the example of FIG. 1 (described above), the system in FIG. 2 includes a brake pedal unit 203 (e.g., a brake "booster") and an electronic stability controller (ESC) 201 configured to provide hydraulic pressures to the rear brake calipers 205, 207. The parking brake control (PBC) 209 is implemented as a software library on the ESC 201 and the system also includes a parking brake switch 211 and motor-on-caliper (MoC) actuators 213, 215 for each of the rear brakes.

However, unlike the example of FIG. 1, the brake pedal unit 203 is also configured to monitor the state of the parking brake switch 211 and to provide control signal outputs to each of the MoC actuators 213, 215. Furthermore, a parking brake control (PBC) mechanism 217 on the brake pedal unit 203. In the example of FIG. 2, the same system PBC software library is stored and operable on both the ESC 201 and the brake pedal unit 203. Accordingly, the parking brake functionality can be implemented in the same way by either the ESC 201 or the brake pedal unit 203 with no perceptible difference to the driver of the vehicle. In some implementations, the system of FIG. 2 is configured such that the ESC 201 operates as the "master" control for the parking brake functionality while the brake pedal unit 203 is configured to operate as the "slave" control for the parking brake functionality. When the "master" (i.e., ESC 201) is available and operating properly, then the ESC 201 provides the control signals to actuate the parking brake. However, when the master (i.e., ESC 201) is not available, the redundant "slave" unit (i.e., the brake pedal unit 203) provides the control signals to the MoC actuators to provide the parking brake functionality for the vehicle.

Figure 3:
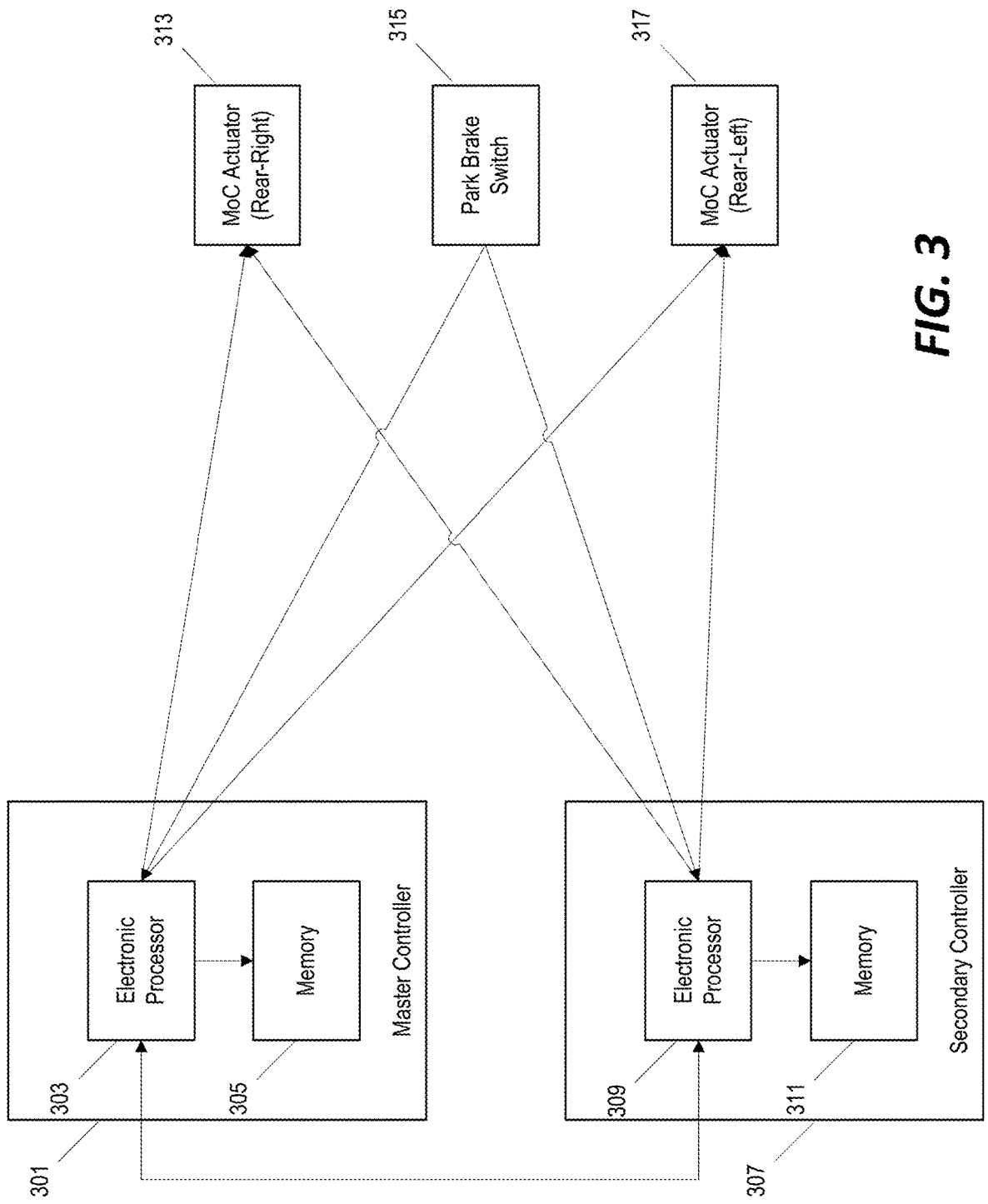
FIG. 3 is a block diagram of a control system for the braking system of FIG. 2.

FIG. 3 illustrates an example of a control system structure for a distributed parking brake system such as the one described in FIG. 2. The master controller 301 (e.g., the ESC 201 in FIG. 2) includes an electronic processor 303 and a non-transitory computer-readable memory 305. The secondary controller 307 (e.g., the brake pedal unit 203 or brake "booster") also includes an electronic processor 309 and a non-transitory computer-readable memory 311. Both memory units 305, 311 are configured to store data and instructions that are executed by the electronic processor 303, 309, respectively, to provide the functionality of the controllers including, for example, the functionality described herein. Each controller 301, 307 is communicatively coupled to the rear-right motor-on-caliper (MoC) actuator 313, the park brake switch 315, and the rear-left MoC actuator 317. Accordingly, both controllers 301, 307 are separately able to monitor the state of the park brake switch 315 and to provide control signals to the MoC actuators 313, 317. In the example of FIG. 3, the master controller 301 is also communicatively coupled to the secondary controller 307 so that the secondary controller 307 can determine whether the master controller 301 is available and operating properly.

Figure 4:
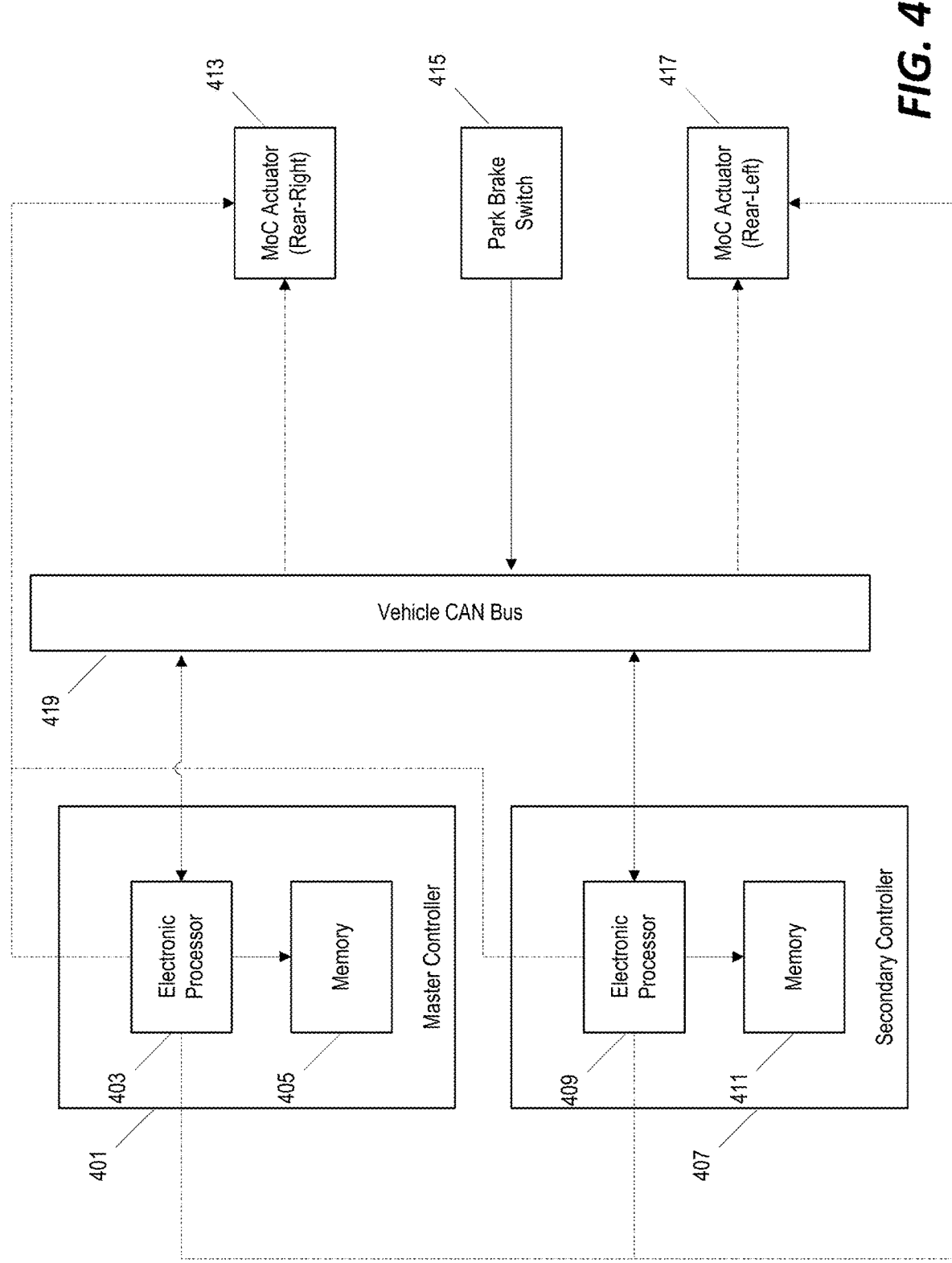
FIG. 4 is a block diagram of an alternative control system configuration for the braking system of FIG. 2 including a vehicle controller area network (CAN) bus.

The components illustrated in FIG. 3 may be communicatively coupled by wired or wireless communication mechanisms. Also, although the example of FIG. 3 shows the various components coupled to each directly, in some implementations, some or all of the components may be configured to communicate via a vehicle controller area network (CAN) bus. FIG. 4 illustrates one such example where the master controller 401 (including its electronic processor 403 and memory 405), the secondary controller 407 (including its electronic processor 409 and memory 411), the rear-right MoC actuator 413, the park brake switch 415, and the rear-left MoC actuator 417 are all communicatively coupled to the vehicle CAN bus 419. Alternatively, in some implementations, the master controller 401, the secondary controller 407, and the park brake switch 415 are all communicatively coupled to the CAN bus 419, but the MoC actuators 413, 417 are directly coupled to the master controller 401 and the secondary control 407 and are not coupled to the CAN bus 419.

In some implementations, the master controller 301/401 and the secondary controller 307/407 may be configured to both provide redundant control signals to the MoC actuators at all times and the MoC actuators may be configured to responds by extending or retracting the caliper piston in response to receiving a control signal from at least one of the controllers. However, in other implementations, the secondary controller 307/407 may be configured to first determine whether the master controller 301/401 is available before transmitting control signals to the MoC actuators. In some implementations, the secondary controller 307 may be configured to determine whether the master controller 301 is available and operable by communicating directly with the master controller 301 (as illustrated in FIG. 3). However, in some other implementations, the secondary controller 407 may be configured to confirm proper operation of the master controller 401 by communicating with the master controller 401 via the CAN bus 419 (as illustrated in FIG. 4). In some implementations, the MoC actuators may be configured to determine whether the master controller is operating properly and to operate based on the control signals from the secondary controller only after determining that the master controller is not available.

Figure 5:
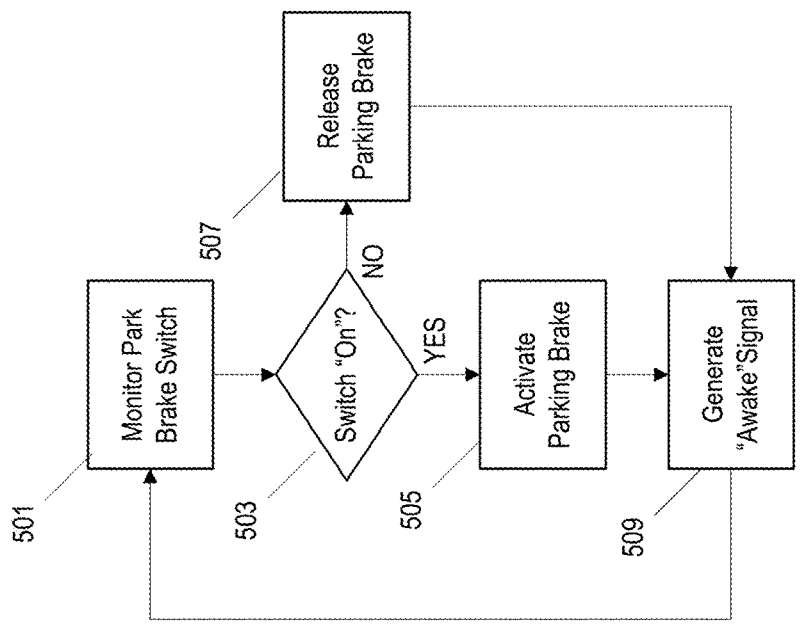
FIG. 5 is a flowchart of a method performed by the master controller for operating the electric parking brake in the system of FIG. 2.

FIG. 5 illustrates one example of an electric parking brake control operation performed by the master controller 301/401. The master controller 301/401 monitors the state of the park brake switch 315/415 (step 501, "Monitor Park Brake Switch") and determines whether the switch 315/415 is in the "on" state (step 503, "Switch 'On'?"). If the park brake switch 315/415 is in the "on" state, then the master controller 301/401 generates a control signal to the MoC actuators 313/413, 317/417 causing the caliper pistons to extend (or to remain extended) and to apply a clamping force to the respective brake rotors (step 505, "Activate Parking Brake"). Conversely, if the switch 315/415 is in the "off" state, then the master controller 301/401 generates a control signal to the MoC actuators 313/413, 317/417 causing the caliper pistons to retract (or to remain retracted) removing the clamping force from the respective brake rotors (step 507, "Release Parking Brake"). The master controller 301/401 also transmits an "awake" signal to the secondary controller 307/407 (step 509, "Generate 'Awake' Signal") indicating that the master controller 301/401 is active and is providing the appropriate control signals for the electric parking brake functionality.

Figure 6:
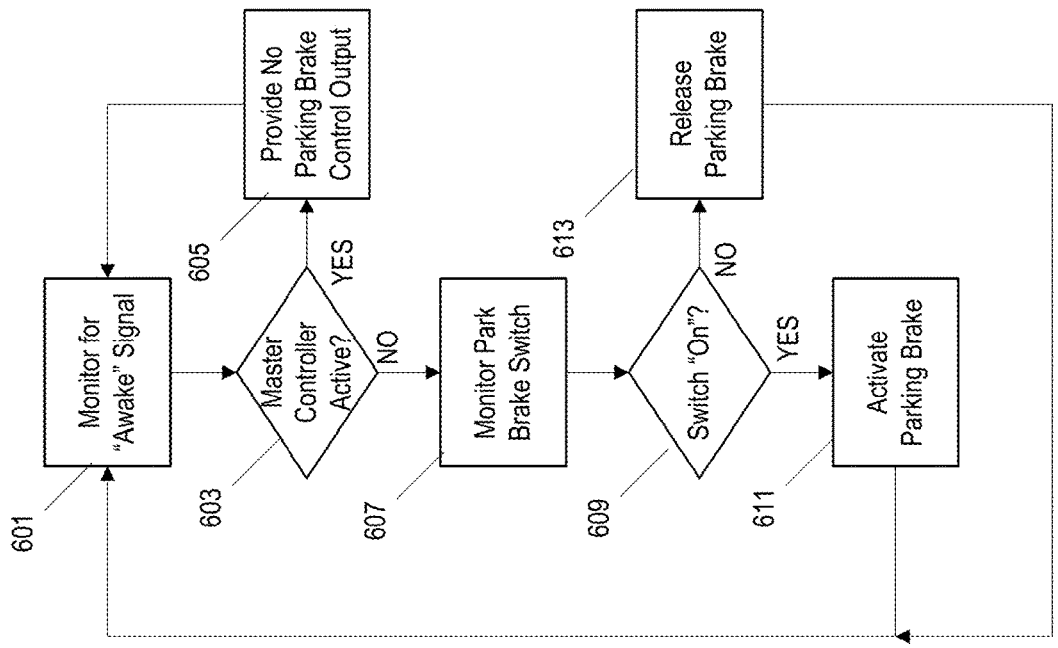
FIG. 6 is a flowchart of a method performed by the secondary controller for operating the electric parking brake in the system of FIG. 2.

FIG. 6 illustrates an example of an electric parking brake control operation performed by the secondary controller 307/407 (e.g., the brake pedal unit or brake "booster") concurrently with the method of FIG. 5 performed by the master controller 301/401. First, the secondary controller 307/407 monitors for the "awake" signal generated by the master controller 301/401 (step 601, "Monitor for 'Awake' Signal"). If the secondary controller 307/407 is able to detect the "awake" signal, it determines that the master controller 301/401 is active and properly controlling the electric parking brake (step 603, "Master Controller Active?"). Accordingly, the secondary controller 307/407 does not generate or output any electric parking brake control signals to the MoC actuators 313/413, 317/417 (step 605, "Provide No Parking Brake Control Output").

However, if the master controller 301/401 is not active or is not operating properly, it will not be able to perform the method of FIG. 5 and the secondary controller 307/407 will not receive the "awake" signal from the master controller 301/401. Therefore, if the secondary controller 307/407 is unable to detect an "awake" signal from the master controller 301/401, the secondary controller 307/407 determines that the master controller 301/401 is not active or is not operating properly (step 603, "Master Controller Active?") and, in response, the secondary controller 307/407 begins operating to provide the electric parking brake functionality. The secondary controller 307/407 monitors the park brake switch 315/415 (step 607, "Monitor Park Brake Switch") and determines whether the switch 315/415 is in the "on" state (step 609, "Switch 'On'?"). If the park brake switch 315/415 is in the "on" state, then the secondary controller 307/407 generates a control signal to the MoC actuators 313/413, 317/417 causing the caliper pistons to extend (or to remain extended) and to apply a clamping force to the respective brake rotor (step 611, "Activate Parking Brake"). Conversely, if the switch 315/415 is in the "off" state, then the secondary controller 307/407 generates a control signal to the MoC actuators 313/413, 317/417 causing the caliper pistons to retract (or to remain retracted) removing the clamping force to the respective brake rotor (step 613, "Release Parking Brake").

Figure 7:
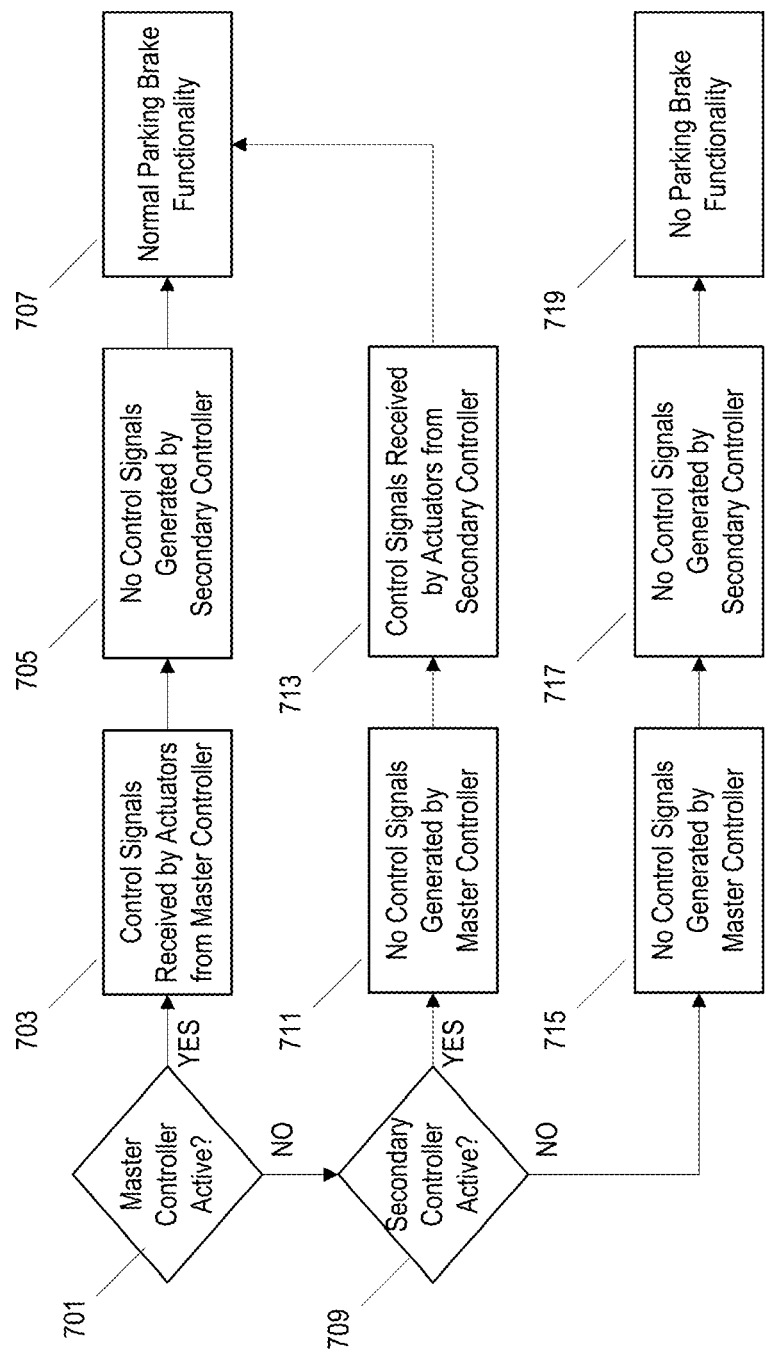
FIG. 7 is a flowchart of system-level operation of the parking brake system depending on the state of the master controller and the secondary controller in the system of FIG. 2.

As discussed above, in some implementations, the master controller 301/401 and the secondary controller 307/407 are configured with the same EPB software and libraries and, accordingly, the electric parking brake will perform the same regardless of which controller is providing the control signals. FIG. 7 schematically illustrates this system-level functionality. If the master controller is active (step 701, "Master Controller Active?"), then the electric parking brake actuators (i.e., the MoC actuators) receive the EPB control signals from the master controller (step 703, "Control Signals Received by Actuators from Master Controller") and the secondary controller does not generate any EPB control signals (step 705, "No Control Signals Generated by Secondary Controller"). The actuators operate in response to the EPB control signals received from the master controller and the electric parking brake functions normally (step 707, "Normal Parking Brake Functionality"). If the master controller is inactive (step 701, "Master Controller Active?"), but the secondary controller is active (step 709, "Secondary Controller Active?"), then the master controller does not generate any EPB control signals (step 711, "No Control Signals Generated by Master Controller") and the electric parking brake actuators receive the EPB control signals instead from the secondary controller (step 713, "Control Signals Received by Actuators from Secondary Controller"). The actuators operate in response to the EPB control signals received from the secondary controller and the electric parking brake functions normally (step 707, "Normal Parking Brake Functionality"). However, if both the master controller and the secondary controller are inactive (steps 701 and 709), then the electric parking brake actuators do not receive control signals from the master controller (step 715, "No Control Signals Generated by Master Controller") or from the secondary controller (step 717, "No Control Signals Generated by Secondary Controller"). As a result, the actuators cannot operate in response to any EPB control signals and no parking brake functionality is provided (step 719, "No Parking Brake Functionality").

The "activation" and "release" of the parking brake mentioned in the example of FIGS. 5 and 6 refer only to the application of the electric parking brake functionality. Hydraulic braking pressures might still be applied to one or both of the rear brakes in response to a depressing of the brake pedal even though the MoC actuator has released the clamping forces from the parking brake functionality. Furthermore, the example of FIGS. 5 and 6 is a simplified example of a static apply/release of the parking brake based on the state of the park brake switch. As discussed above, in some implementations, the master controller and the secondary controller are configured to provide additional and/or more advanced parking brake control functionality. In some implementations, the parking brake control functionality is provided only by the master controller or only by the secondary controller depending on whether the master controller is available and functioning properly. In other implementations, some parking brake control functions may be distributed between master controller and the secondary controller during normal operation of both controllers.

In some implementations, all of the park brake control functionality is provided through the master controller as long as the master controller is available and, in the event of any failure which brings down the master controller, all of the same park brake control functionality is handled by the secondary controller. In implementations where the same parking brake software libraries are used by both the master controller and the secondary controller, the driver will not notice any change or degradation in park brake control functionality when control switches from the master controller to the secondary controller. Accordingly, a single-point failure of the ESC will not reduce any PBC functionality as PBC control will transfer to the RBU or iBooster ECU.

In the specific examples described above, only a single "secondary" controller is configured to provide "back-up" control of the electric parking brake functionality in the event that the master controller is not available or not functioning properly. In such implementations, the parking brake functionality is unavailable when both the master controller and the secondary controller are inactive as illustrated in the example of FIG. 7 and the MoC actuators will not be actuated in response to movement of the parking brake switch into the "on" state. However, in some other implementations, additional system controllers might be configured with some or all of the EPB control libraries and configured to operate the MoC actuators in response to determining that both the master controller and the secondary controller are unavailable. Accordingly, some or all of the EPB functionality might still be operational even when both the master controller and the first secondary controller are not functioning properly.

For regular cars, parking brake functionality will not be affected even if the ESC system is faulted. For highly-automated driving (HAD) cars, this distributed functionality can provide stand-still management, can be applied in case of emergency situations, and can protect redundancy actuators from overheating. In cases where the parking brake is locked on not responsive to the ESC system, the secondary controller may be able to provide an additional source of actuation (e.g., the apply and release commands).

Thus, the invention provides, among other things, a system and method for distributed control of an electric park brake. Various features and advantages are set forth in the following claims.

What is claimed is:

1. A vehicle braking system comprising:
   a first brake system controller configured to
      monitor a status of an electric parking brake switch,
      generate an awake signal that indicates the first brake system controller is active, and
      transmit a control signal to a motor-on-caliper actuator based on the status of the electric parking brake switch, wherein the control signal causes the motor-on-caliper actuator to extend a caliper piston and apply a clamping force to a brake rotor when the electric parking brake switch is in an on-state, and wherein the control signal causes the motor-on caliper actuator to retract the caliper piston when the electric parking brake switch is in an off-state; and
   a second brake system controller configured to
      monitor the electric parking brake switch, wherein the second brake system controller and the first brake system controller concurrently monitor the electric parking brake switch,
      control at least one function of the braking system not related to a parking brake function,
      determine whether the first brake system controller is available by communicating with the first brake system controller,
      determine, based on the awake signal that indicates the first brake system controller is active, whether the first brake system controller is operating properly, and
      in response to determining, based on the awake signal that indicates the first brake system controller is active, that the first brake system controller is not operating properly due to a fault in the first brake system controller, transmit the control signal to the motor-on-caliper actuator based on the status of the electric parking brake switch.

2. The vehicle braking system of claim 1, wherein the second brake system controller is configured to be connected to a brake pedal unit, and wherein the brake pedal unit is configured to control the at least one function of the braking system not related to the parking brake function by regulating a pedal feel of a brake pedal.

3. The vehicle braking system of claim 1, wherein the second brake system controller is configured to control the at least one function of the braking system not related to the parking brake function by providing a hydraulic pressure output to the braking system based on a position of a brake pedal.

4. The vehicle braking system of claim 1, wherein the first brake system controller is an electronic stability controller, wherein the electronic stability controller is further configured to control braking force distribution to a plurality of wheels of a vehicle to enhance performance and stability.

5. The vehicle braking system of claim 1, wherein the first brake system controller and the second brake system controller include the same library to control the motor-on-caliper actuator based on the status of the electric parking brake switch.

6. The vehicle braking system of claim 1, wherein the motor-on-caliper actuator is configured to
   in response to the second brake system controller determining that the first brake system controller is not available, operate based on the control signals from the second brake system controller.

7. A method of operating a vehicle braking system, the vehicle braking system including a first brake system controller and a second brake system controller, the method comprising:
   monitoring a status of an electric parking brake switch, wherein the first brake system controller and the second brake system controller concurrently monitor the electric parking brake switch;
   generating, by the first brake system controller, an awake signal that indicates the first brake system controller is active;
   transmitting, from the first brake system controller to a motor-on-caliper actuator, a control signal based on the status of the electric parking brake switch, wherein the control signal causes the motor-on-caliper actuator to extend a caliper piston and apply a clamping force to a brake rotor when the electric parking brake switch is in an on-state, and wherein the control signal causes the motor-on caliper actuator to retract the caliper piston when the electric parking brake switch is in an off-state,
   controlling, by the second brake system controller, at least one function of the braking system not related to a parking brake function;
   determining, by the second brake system controller based on the awake signal that indicates the first brake system controller is active, whether the first brake system controller is operating properly; and
   transmitting the control signal from the second brake system controller to the motor-on-caliper actuator based on the status of the electric parking brake switch only in response to determining, by the second brake system controller based on the awake signal that indicates the first brake system controller is active, that the first brake system controller is not operating properly due to the fault in the first brake system controller.

8. The method of claim 7, wherein the second brake system controller includes a brake pedal unit, and
   wherein controlling, by the second brake system controller, the at least one function of the braking system not related to the parking brake function includes regulating a pedal feel of a brake pedal.

9. The method of claim 7, wherein controlling, by the second brake system controller, the at least one function of the braking system not related to the parking brake function includes providing a hydraulic pressure output to the braking system based on a position of a brake pedal.

10. The method of claim 7, wherein the first brake system controller is an electronic stability controller, and the method further comprising controlling, by the first brake system controller, a braking force distribution to a plurality of wheels of the vehicle to enhance performance and stability.

11. A brake pedal controller configured to:
monitor a position of a brake pedal of a vehicle;
adjust a hydraulic pressure output to a braking system based on the position of the brake pedal;
determine whether an electronic parking brake controller is operating properly based on an awake signal that indicates the electronic parking brake controller is active;
determine whether the electronic parking brake controller is available by communicating with the electronic parking brake controller; and
transmit a parking brake engage signal to a motor-on-caliper actuator only in response to determining that the electronic parking brake switch is in an on-state while the electronic parking brake controller is not operating properly due to a fault in the electronic parking brake controller, wherein the parking brake engage signal is configured to cause the motor-on-caliper actuator to extend a caliper piston and apply a clamping force to a brake rotor.

12. The brake pedal controller of claim 11, further comprising an electric motor configured to adjust a pedal resistance in response to a brake feel control signal, wherein the brake pedal controller is configured to
generate a brake feel control signal based on braking pressures applied to brakes of a vehicle by other braking systems, and
transmit the brake feel control signal to the electric motor of the brake pedal controller.

* * * * *